United States Patent [19]

Kramer et al.

[11] Patent Number: 5,001,818

[45] Date of Patent: Mar. 26, 1991

[54] UNDERWATER MILLING MACHINE SYSTEM FOR CORE BARREL REPAIR

[75] Inventors: Arthur W. Kramer, Jeannette; Edward H. Smith, Brave, both of Pa.

[73] Assignee: Westinghouse Electric Corp., Pittsburgh, Pa.

[21] Appl. No.: 251,694

[22] Filed: Sep. 30, 1988

[51] Int. Cl.[5] ........................ B23B 39/14; B23B 41/10

[52] U.S. Cl. ...................................... 29/26 B; 408/88; 408/234; 409/175; 409/241

[58] Field of Search ............. 29/26 B, 26 A; 409/175, 409/178, 241, 199; 901/37, 41, 42; 408/72 R, 88, 234

[56] References Cited

U.S. PATENT DOCUMENTS

| | | | |
|---|---|---|---|
| 2,985,040 | 5/1961 | Border, Jr. | 409/175 X |
| 3,138,998 | 6/1964 | Ivan | 409/178 |
| 3,687,007 | 8/1972 | Harris | 409/178 |
| 3,945,749 | 3/1976 | McIlrath | 408/95 |
| 4,022,106 | 5/1977 | Kile | 409/178 |
| 4,292,133 | 9/1981 | Sasaki et al. | 176/36 R |
| 4,329,094 | 5/1982 | Cooley et al. | 408/77 |
| 4,526,311 | 7/1985 | Schroder | 228/119 |
| 4,534,093 | 8/1985 | Jahnke et al. | 409/241 X |
| 4,585,613 | 4/1986 | Styskal et al. | 376/260 |
| 4,590,671 | 5/1986 | Havoic-Conroy | 29/723 |
| 4,675,961 | 6/1987 | Spofford et al. | 29/33 K |
| 4,720,898 | 1/1988 | Calfo et al. | 29/33 K |
| 4,862,568 | 9/1989 | Wankmuller et al. | 29/26 B |

FOREIGN PATENT DOCUMENTS

| | | |
|---|---|---|
| 2537327 | 6/1984 | France . |
| 5973795 | 10/1982 | Japan . |
| 2119309 | 1/1983 | United Kingdom . |

*Primary Examiner*—Z. R. Bilinsky

[57] ABSTRACT

A machining system for performing heavy duty milling and other repair operations under water is disclosed herein which is particularly useful in performing repair and maintenance operations in the core barrels of nuclear reactors. The machining system generally comprises a platform, a machining device which is detachably connectable to the platform which includes a drive motor and cutter necessary to effect the repair or maintenance operation, and a triaxial adjustment mechanism which permits the machine cutter to be precisely positioned at any desired location within the core barrel. The platform has a guide mechanism which includes both a rough and a fine guide means which precisely positions the machining device with respect to the platform when it is lowered thereon. A hydraulically operated lock remotely and detachably secures the machining device into position on the platform after the guide mechanism has properly positioned it. The platform is advantageously designed to be secured onto a component within the core barrel having a known and precise alignment with respect to the other core barrel components, such as the support lugs of the thermal shield, which in turn provides a mechanical reference point for the machine cutter attached to the platform.

18 Claims, 5 Drawing Sheets

UNDERWATER MILLING MACHINE SYSTEM FOR CORE BARREL REPAIR

BACKGROUND OF THE INVENTION

The present invention relates to a machining system that can handle most of the machine operations that a conventional milling machine could perform, but which is remotely controllable under water and in a radioactive, chemical or other toxic environment. The machining system is particularly useful for the repair and maintenance of the core barrel of a nuclear reactor.

As the various components within the core barrel of a nuclear reactor age, they require more frequent maintenance. Up to now, the approach taken by maintenance engineers has been to develop specialized tools on an ad hoc basis to perform a specific repair or maintenance operation. For example, specialized tools and procedures such as that illustrated in U.S. Pat. No. 4,720,898 were developed to replace worn out split pins in the guide tubes mounted above the fuel assemblies in the core of the reactor. Similarly, tools such as that illustrated in U.S. Pat. No. 4,292,133 were developed for replacing worn out control rod drive mechanisms in the upper core barrel of such reactors The end result of this problem-solving philosophy has been the development of a relatively large number of expensive and specialized tools that must be used one-at-a-time to perform a series of maintenance operations on a single core barrel. The serial use of such specialized tools is, of course, time consuming as each tool must be set up, used and removed from the core barrel before the next tool may be used. Moreover, the specialized nature of each tool allows for little or no flexibility where a particular core barrel develops a unique problem. This is a serious limitation, as the utilities who manage such nuclear power facilities generally want all of the maintenance and repair needs of the core of a particular reactor to be dealt with during a single shutdown period. Hence, if an unexpected maintenance or repair need is discovered in the course of performing the planned repairs or maintenance operations, the maintenance personnel are often forced to immediately design, build and operate a new specialized tool so that all the necessary repairs will be completed within the same time period. The resulting time requirements for performing multiple maintenance tasks in a core barrel are not only expensive in monetary terms, as each day of down time of a nuclear reactor can cost a utility well over $1,000,000 in lost revenues a day, but further results in the exposure of the maintenance operators to significant amounts of potentially harmful radiation. While milling machines for performing general machining operations on large devices are, of course, known in the prior art, the Applicants are not aware of any such devices which could are compact enough to be practically and effectively used under water by remote control in the hostile, radioactive environment inside a core barrel.

Clearly, there is a need for a versatile machining apparatus capable of performing a multiplicity of different machining operations within the core barrel of a nuclear reactor in a safe, reliable and expeditous manner. Ideally, such a machining system should be rapidly installable within a core barrel and capable of performing machining operations within a few thousands of an inch. Finally, it would be desirable if the components of the machining system were easily decontaminable after use.

SUMMARY OF THE INVENTION

In its broadest sense, the present invention is a machining system and method which operates under water within a nuclear vessel and is versatile in that a wide variety of machining tasks can be performed. The machining system is easily positioned and assembled underwater within a nuclear vessel, and can be remotely operated and controlled. The ease of assemblage is of particular importance in many instances for nuclear equipment repair wherein the access is frequently limited to the vertical space above the component to be machined.

In the preferred embodiment, a platform is first provided within the nuclear vessel to be repaired and the platform is supported in a substantially horizontal plane. This platform is advantageously detachably connectable to components within the core barrel which have been previously placed in precise alignment with other components in the core barrel during its initial assembly, such as the thermal shield support lugs, which gives the operators of the system a precisely known mechanical reference point. Thereafter, a machining device including the drive motor and cutter necessary for the repair job is connected to the platform from above. This connection is facilitated by guide means which preferably includes a rough guide means and a fine guide means, and a plurality of locks, which together precisely position the machine on the platform and lock the machining device in place. The detachable machining device includes an X Y Z adjustment mechanism thus permitting the machine cutter to be precisely positioned for its machining operation. This three-way adjustment mechanism allows the machining device to operate over the entire range defined by the range of each of the three axes on a single setting of the support platform. The use of separable components including a platform and a detachable machining device facilitates the relocation of the machining device in that only the relatively small and lightweight platform need be relocated and resecured within the core barrel for the entire device to be precisely aligned therein. Once the platform has been repositioned and resecured, the machining device can be easily reattached thereto. During the initial positioning or repositioning of the platform, the separable machining device with the three-way adjustment mechanism can be maintained above the platform by a manipulator such as a crane. The platform can then be manipulated either by another remote manipulator or manually by a diver without interference from the remote control mechanisms necessary for the drive motor and three-way adjustment mechanisms. It has also been found that the decontamination of the machining system is facilitated by the breakage of the machining system into the above described components. This is because the more cavity ridden structure of the machine and adjustment mechanism can be removed from the radioactive water when not in use and permitted to drip dry. This reduces the chance of radioactive water leaking into the machine through the seals of the machine due to water pressures that may result from the depth of the water. The platform itself being a simpler structure can be more easily decontaminated even after setting within the radioactive water for a long period of time.

In the method of the invention, a machining operation on a nuclear vessel can be conducted below the surface of water in the vessel by: setting the platform in the vessel in a substantially horizontal plane and securing it to a component having a known precise alignment with the other components in the core barrel, lowering the machining device with its three way adjustment mechanism from a position above the platform toward the platform, thereafter guiding the machining device into engagement with the platform and locking the machine to the platform. All operations including activating the drive motor and cutter are remotely controlled. This method therefore is advantageous in that it facilitates the assemblage of the machining system and operation thereof from above the water level in a reactor vessel, wherein the machining device and platform automatically align with one another as the device is lowered onto the platform, provided it is within a given range of a rough guiding mechanism extending upward from a top surface of the platform. The method thus provides a machining system that basically builds upon itself to provide a complete machining system that is remotely controlled from a safe position to perform high precision machining on a nuclear reactor vessel component.

The assemblage of the machining system and operation thereof is also preferably aided by the use of cameras which can be located on the machining device itself and by cameras mounted on free masts. Monitors located above the water are then viewed as part of the control arrangement.

DETAILED DESCRIPTION OF THE PREFERRED EMBODIMENT

Figure 1:
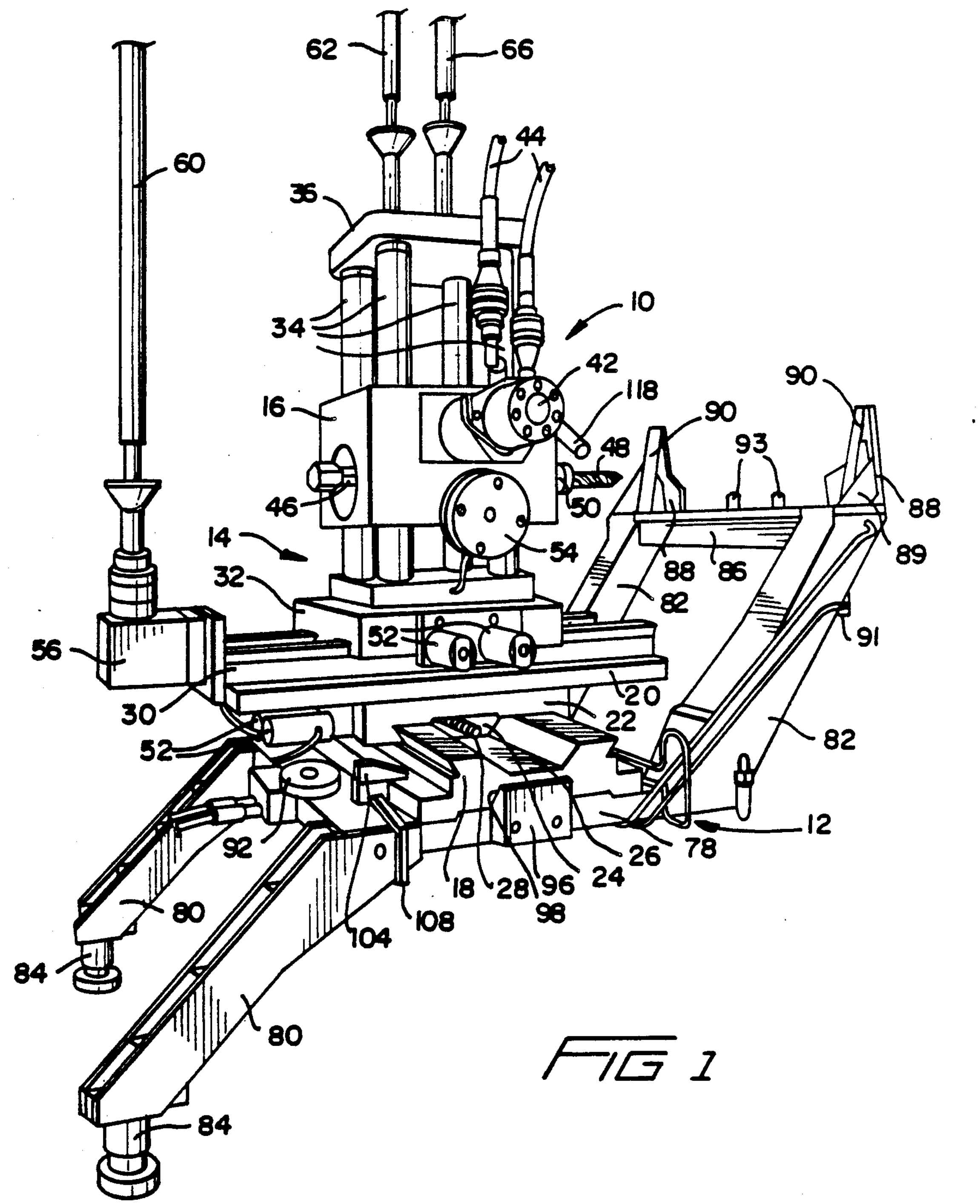
FIG. 1 is perspective view of a preferred embodiment of the present invention.
Figure 2:
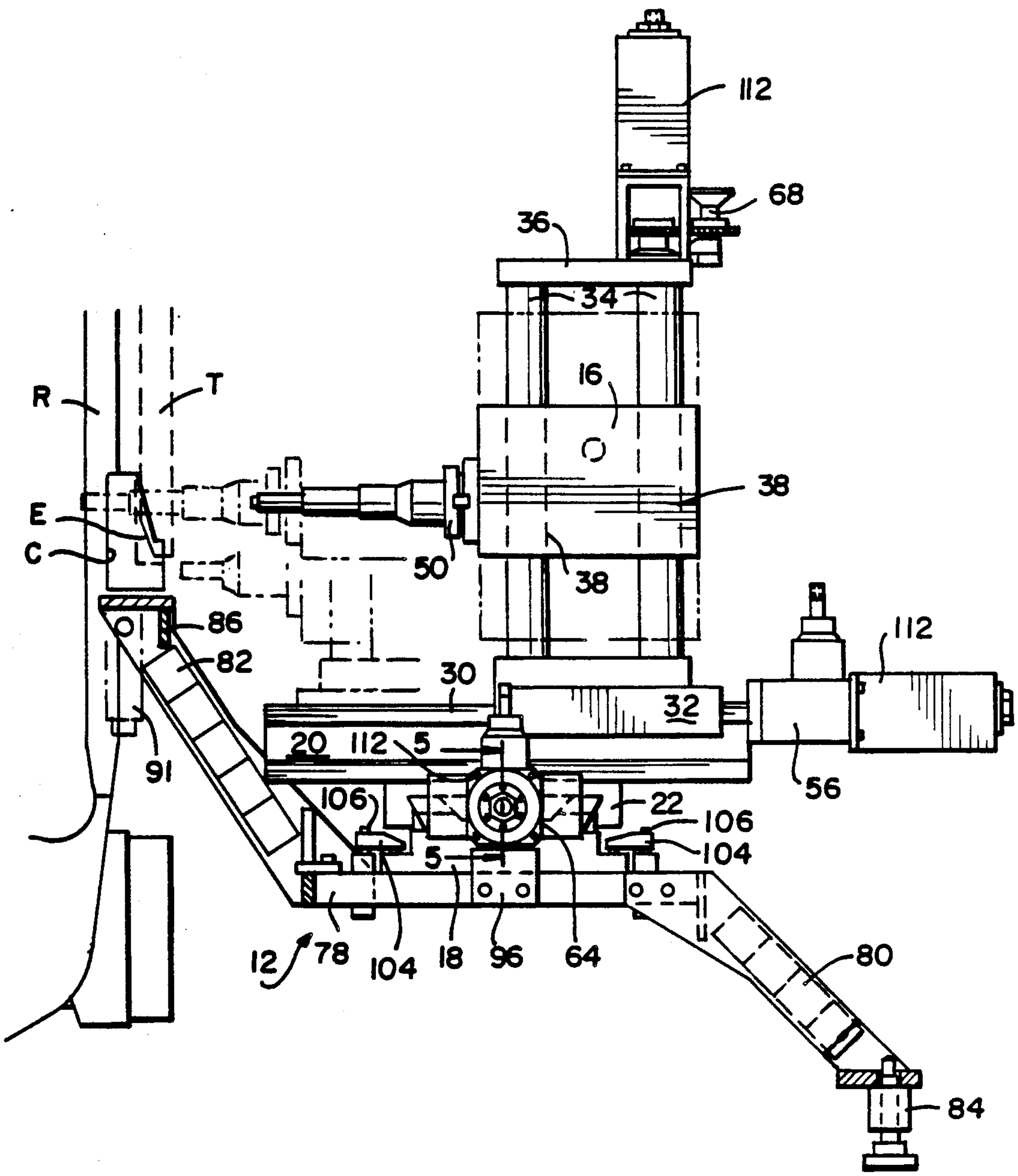
FIG. 2 is a side view of the preferred embodiment illustrating the adjustability of the machine relative to a reactor vessel.

With reference now to FIGS. 1 and 2, wherein like numerals designate like components throughout all of the several figures, the underwater machining system 10 generally comprises a platform 12 and a machining device 14. The machining device 14 includes a milling or boring machine 16 and an X Y Z adjustment mechanism. The X Y Z adjustment mechanism permits spacial positioning of the milling machine 16 along three axes, each of which is perpendicular to the others. The X Y Z adjustment mechanism comprises a first horizontal slide table 18 to be secured to the platform 12, as described below, which cooperates with a second horizontal slide table 20 particularly at a lower slide 22 of the second slide table 20. The lower slide 22 includes a downwardly extending portion 24 which extends into a groove 26 formed in the upper surface of the first slide table 18. A lead screw 28 is provided in a conventional matter to threadingly engage with a bore in the portion 24 to drivingly impart horizontal movement to the second slide table 20 when rotated. The lead screw 28 is appropriately mounted in bearings (not shown) which axially secure it so that it may drive the second table 20 as it is rotated, as is well known. The drive mechanism for the lead screw 28 is further described below. The second slide table 20 also includes an upper slide 30 which cooperates with a third slide table 32. The upper slide 30 of the second slide table 20 is arranged horizontally perpendicular to the lower slide 22, thus defining the X axis of horizontal movement perpendicular to the Y axis of horizontal movement provided by slides 22 and 18. The X axis slide mechanism including upper slide 30 and the third slide table 32 includes a similar lead screw driving assembly like that described above at 28 with respect to slides 22 and 18. This second lead screw mechanism drives the milling machine 16 along its X axis.

Figure 4:
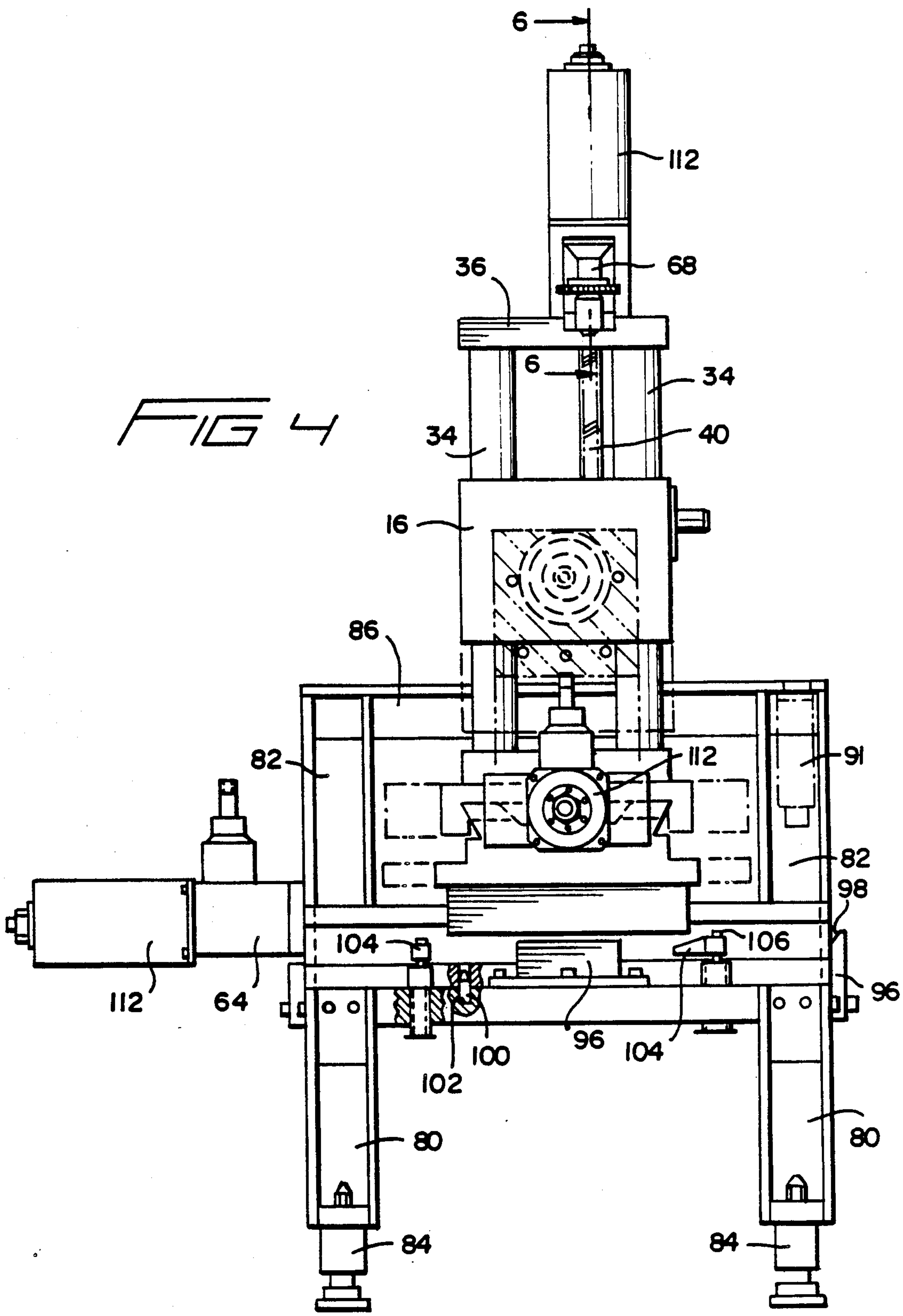
FIG. 4 is an end view of the machine of the preferred embodiment viewed from the right side of FIG. 2.

In order to provide adjustment along the Z axis, slide posts 34 are arranged perpendicularly to both horizontal axes X and Y and are secured to the top side of the third slide table 32. The slide posts 34, of which four are preferable, are attached at their other end to a top plate 36 thereby securing the slide posts 34 in spaced relation. The milling machine 16 is provided with bores 38 extending therethrough through which the slide posts 34 extend These bores 38 may include conventional bearings or sleeves to enhance their sliding relationship. As seen in FIG. 4, another lead screw mechanism 40 is illustrated that extends downward from the top plate 36 to threadingly engage a bore provided within milling machine 16, so that rotation of the lead screw 40 will result in movement of the milling machine 16 along the Z axis, which is the vertical direction.

The milling machine 16 is provided with a hydraulic drive motor 42 which can be appropriately controlled by hydraulic lines 44 to rotationally drive an impeller (not shown) within the hydraulic motor 42. The use of a hydraulic or air motor is preferred as such motors are not as sensitive to water leakage as an electric motor are. The impeller of the hydraulic motor 42 operatively drives a cutter shaft 46 in any conventional manner such as by cooperating worm gears, bevelled gears or with a gear reduction mechanism within the milling machine 16. The cutter shaft 46 extends from the milling machine 16 for connection to a cutting bit 48. The shaft 46 is appropriately fitted with a chuck device 50 for connecting a cutting bit such a 48 to the shaft 46, and for permitting release of the cutting bit and replacement with another. The chuck includes features to permit the removal and interchange of various cutters, dowels and fasteners. The interchange is facilitated by the use of specialized long handled tools and a nearby magazine. Pneumatic brakes 52 are also provided on the slide tables for locking the slide assemblies in the X and Y axes directions for precisely securing the slides once they have been adjusted in proper position. These pneumatic brakes can be of any conventionally known brakes and can be remotely controlled by way of air lines from a control center above the device. Likewise, a pneumatic brake 54 is provided on the milling machine 16 for locking the milling machine 16 in place after it is adjusted along slide posts 34.

Figure 5:
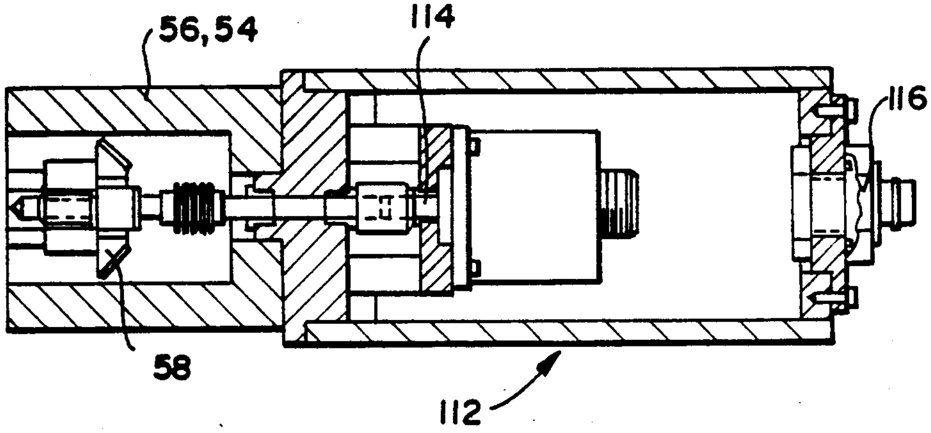
FIG. 5 is a cross sectional view taken along line 5—5 in FIG. 2.
Figure 6:
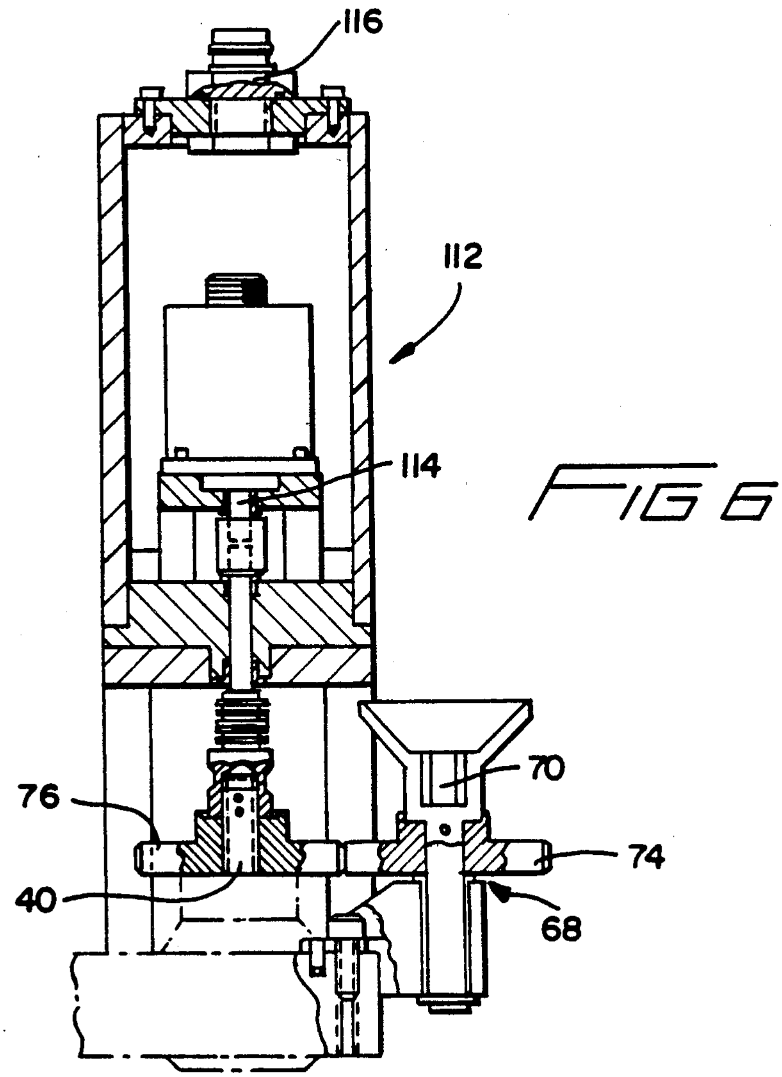
FIG. 6 is a cross sectional view along line 6—6 in FIG. 4.

The drive mechanisms for each of the lead screw assemblies of both horizontal slides and the vertical slide assembly is described as follows. A 90 degree gear box drive unit 56 is shown in FIG. 1 for driving the lead screw of the upper horizontal slide that includes slides 30 and 32. A cross sectional view of a portion of the box 56 is shown in FIG. 5, wherein a bevel gear 58 is shown connected to an end portion of the lead screw. The bevel gear 58 is appropriately driven from another bevel gear (not shown) that is connected to the remote drive shaft 60, driven from above at a control station through an opening on the upper surface of the gear box unit 56. By this assembly, it is easily seen that rotation of remote drive shaft 60 can be transferred by way of a bevel gear arrangement to drive the lead screw of the slider assembly by way of the 90 degree gear box drive unit 56. A second remote drive shaft 62 is similarly provided to drive the lower slide assembly between slides 22 and 18 by rotating the lead screw 28 via a second 90 degree gear box drive unit 64, seen in FIG. 2. The gear box 64 is the same as the gear box 56 previously described. Rotation of the first remote drive shaft 60 thus imparts movement of the milling machine 16 along the X axis whereas rotation of the second remote drive shaft 62 moves the milling machine 16 along its Y axis. A third remote drive shaft 66 engages with a transmission mechanism 68 seen in FIGS. 2 and 4 and in cross-section in FIG. 6. With reference to FIG. 6, it can be seen that the third remote drive shaft 68 is to be inserted into a torque transmitting socket 70 of rotatable shaft 72, which is in turn keyed or fixed to a first gear 74. The gear 74 engages with a second gear 76 which is appropriately keyed or fixed to a extension of the lead screw 40. The transmission mechanism 68 therefore transfers the rotational drive torque from the third remote drive shaft 66 to the lead screw 40 to thus move the milling machine 16 along its Z axis slide, comprised of slide post 34 and bores 38.

Now that the machining device 14 has been sufficiently described, the platform 12 is detailed as follows. The platform 12 comprises a substantially horizontal center portion 78, a pair of support legs 80 at one side of the horizontal portion 78, and a pair of upwardly and outwardly extending legs 82. The support legs 80 support the platform 12 above the floor of a vessel or core barrel of a nuclear reactor in which the machining device is to be used. These legs 80 include adjustable platform feet 84 which may be of a known screw thread type for the purpose of levelling the platform 12 for use. The upwardly extending legs 82 include a support bar 86 extending between the legs 82, and each of the legs 82 further includes a register foot mechanism 88. The register foot mechanisms 88 are fixed at the upper ends of the legs 82, and are reinforced with braces 89. Each register foot 88 slidably supports a wedge 90 on the machine side vertical face thereof. These wedges 90 are driven by hydraulic cylinders 91 which are secured to the legs 82 with the movable piston connected to the wedges 90. The wedges 90 can then be vertically moved along register feet 88 for clamping to a nuclear vessel or core barrel as described below.

Figure 3:
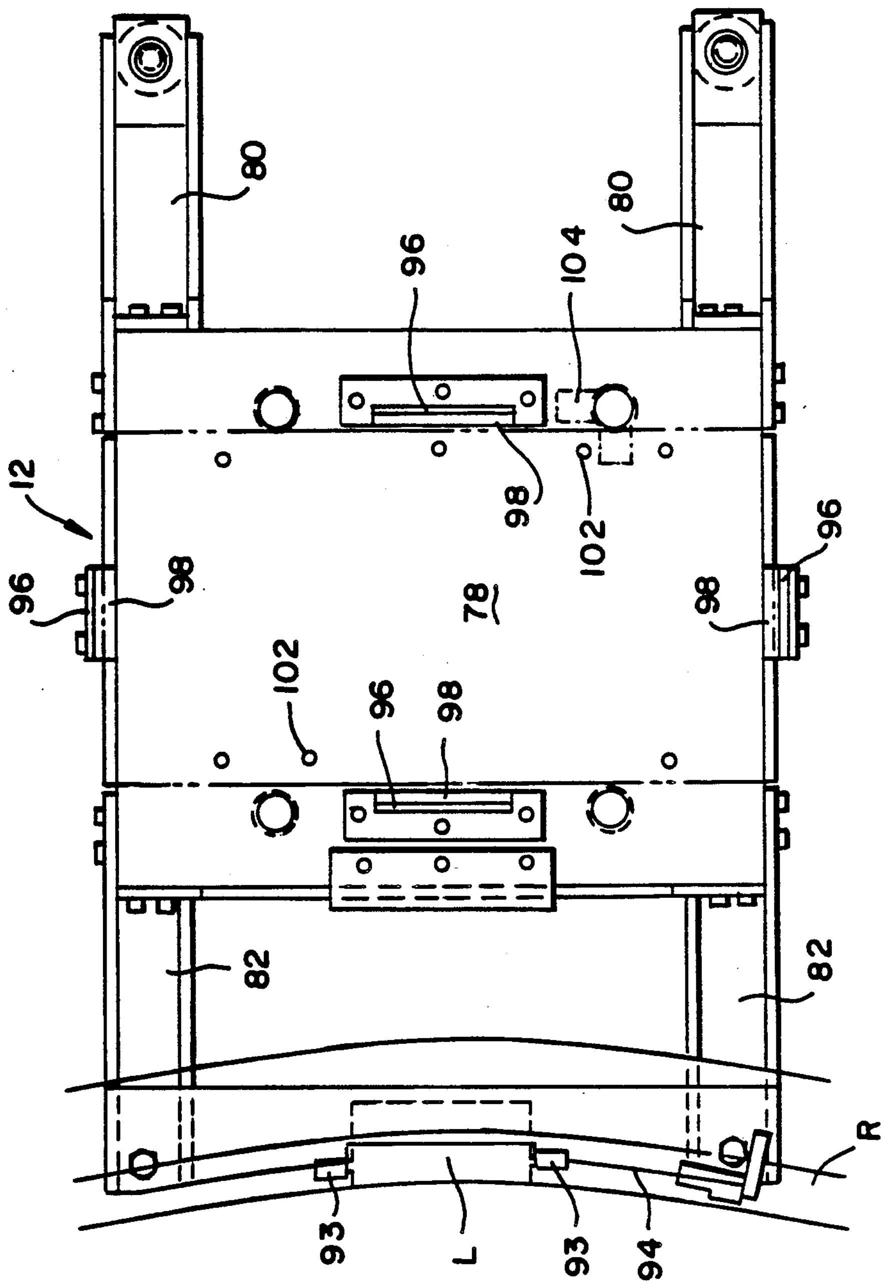
FIG. 3 is a top plan view of the platform of the preferred embodiment viewed along line 3—3 of FIG. 2.

As can be seen in FIG. 2, the machining system is shown in one application within a nuclear vessel wherein the feet 88 and legs 82 can be used to support the platform 12 in its horizontal position by abutment with a substantially vertical side wall R of a nuclear core barrel. The register feet 88, in this application of the machine, register with a circumferential groove C provided in the core barrel wall R. A thermal shield T (shown in phantom) is provided around the core barrel with an annular space therebetween, with a chamfered edge at the lower end thereof. This annular space and the chamfered edge are utilized in this application to clamp the register feet 88 thereto by driving wedges 90 upwardly from cylinders 91. The wedges 90 extend within the annular space and wedge against the chamfered edge, thereby securely clamping the legs 82 to the core barrel. To further facilitate this connection, register buttons 93 are provided on support bar 86 as shown in FIG. 3. These register buttons 93 are accurately space to correspond to the length of an L-shaped support lug L bolted to the core barrel to support the thermal shield. The register buttons 93 are used to precisely locate the platform on a specific location of the core barrel, as indicated by the lugs L. The platform 12 is then appropriately levelled by adjustment of the lower feet 84. A circle level 92 located on the center portion 78 of the platform 12 can also be included to indicate when the platform is level. The support bar 86 extending between the upper legs 82 is appropriately shaped as shown in FIG. 3 to approach or engage the side wall of the barrel R. In this particular case the support bar includes a curved front surface 94 allowing the feet 88 to bear against the barrel wall R without interference. The support bar 86 and the register feet 88 may be interchangeable to include a variety of shaped front surfaces to facilitate the abutment of the platform 12 against a wide variety of reactor components which may be machined. The portion 78 can alternatively be supported by magnets, chains, cable or other mechanical arrangements.

The machining device 14 and the platform 12 are advantageously separable from one another. In order to attach them to one another, the lower surface of the first horizontal slide table 18 is set on top of the central portion 78 of the platform 12. No permanent connection is provided between the machining device 14 and the platform 12 so that the machining device 14 can be removed and the support platform 12 can be easily positioned and levelled without the weight of the machining device 14 thereon. Thereafter the machining device 14 is connected to the platform for the performance of its machining operation. The manner in which the machining device 14 is removably attached to the platform 12 is described below.

In order to facilitate the alignment of the machining device 14 onto the central portion 78 of the platform 12, the platform 12 includes a plurality of vertically extending guide members 96, of which only one can be seen in FIG. 1. These guide members 96 include tapered surfaces 98 for urging the machining device 14 by way of the first slide table 18 into proper alignment. As is clearly shown in FIG. 3, there are preferably four vertically extending guide members which are used to locate the slide table 18 thereinbetween. Preferably these are provided on all four sides of the square shaped slide table 18. To further facilitate proper alignment, a fine guide means is also provided by way of dowels 100 that extend downwardly from the bottom surface of the slide table 18 (see FIG. 4) which are inserted into openings 102 present in the upper surface of the horizontal center 78 of the platform 12. By this dual alignment system including a rough adjustment and a fine adjustment, the machining device 14 is precisely aligned on the platform 12, and can be done so from a remote location even under conditions of limited visibility. This is an important feature in view of the distance between the machining device 14 and the operator, and the limited visibility presented by the cloudy water typically present in core barrels. Accordingly, the operator needs to only approximately align the components when lowering the machining device 14 to the platform 12 because this dual guide means will roughly align and precisely align the machine on the platform. The range of adjustment of the guide means is determined by the length of the tapered surface 98, which can be designed in accordance with a desired range of adjustment. Typically, the range is kept between 1½–2 inches.

Once the machining device 14 is accurately aligned with and set upon the platform 12, it is necessary to lock the components together before any machining operation is to take place. For this purpose, hydraulically operated swinging locks 104 are connected to pins 106 which are pivotally mounted to portion 78 of the platform 12. As can be seen in FIG. 3, there are preferably four of such swinging locks 104 which move from an unlocked position (not interfering with the first slide table 18) to an interfacing position when rotated 90 degrees. Once the slide table 18 is positioned on the platform 12, the swinging locks 104 are hydraulically driven via pressureized fluid from hydraulic lines 108 to swing the locks 104 into engagement with ledges 110 on the slide table 18. These hydraulically driven swinging locks 104 are also remotely actuated from above by way of supplying the appropriate pressure and release the hydraulic lines 108. In particular, the swinging locks 104 are unlocked by supplying pressure to vertically shift the pivot pins 106 which are forced to rotate by 90° by cam surfaces between the pins 106 and the portion 78.

A work station and remote control area for an operator is usually provided above the nuclear vessel within which the milling operation is to be performed. In order to accurately position the milling machine 16 by way of the X Y Z adjustment mechanisms, it is essential that the positions along each slide mechanism are known to the operator. The positioning control of the milling machine 16 is accomplished through the three shafts 60, 62 and 66 which extend vertically to several feet above the surface of the water. To position the milling machine 16, the remote drive shafts extend into the remote control area and may include dials with graduations thereon for reading by an operator. There can also be fixed stops or detents at preset positions, or encoders may be provided at each of the junctions of the drive shafts to their respective slides which can be connected to a digital display in the remote control area.

Encoders of the type necessary for providing a digital display are shown at 112 on each of the connection of the remote drive shafts to the slide mechanism lead screws. See FIGS. 2, 4, 5 and 6. Encoders which are satisfactory for these purposes are "Rotopulsor" type encoders supplied by Dynapar Corp. of Gurney, Ill. as Part No. 42-600. The basic operation of each of the encoders includes a shaft 114 which is operatively connected to an end of the lead screw of each adjustment mechanism. The shafts 114 rotate therewith a disk, wherein the disk includes at least one discrete opening or conductive device which transmits a pulse from a light or an electronic source which are then counted by the encoder. By counting the number of pulses, whether it be one pulse per rotation or other, it is possible to obtain an accurate representation of the position of the milling machine in each of the X Y and Z axis directions. A bushing and connection 116 is provided on the encoder 112 for allowing passage of the necessary wiring between the internal area of the encoder to the remote control area and digital display.

The machining operation can also be remotely controlled to change the rate of feed to the milling or boring machine by the lead screws, as well as to the hydraulic motor to vary the RPMs. This is necessary when using different size cutters and bits for the machine. The controls are provided at the remote control area.

A camera 118 is prefereably also attached to the milling machine 16, which is remotely connected to the remote control station above. The camera or cameras provided on the machine aid the operator in providing a precise machining apparatus which can be run from a safe position well above the nuclear vessel. Additional cameras may also be mounted on free masts which extend downward from the remote control station and may be placed all around the machining system 10 to ensure accurate and complete machining of the component being repaired from above as seen by an operator. Each of the cameras can also be remotely controlled from above to tilt or pan the cameras so that the operator can see the entire machining area.

It is also noted that this machining system can be used to install and remove screws as well as dowels. The rotatably driven shaft 46 can be connected to the screws or dowels by way of the chuck 50, and can be driven in or out of bores that may also be machined.

As can thus be seen from the above description of the machining system of the present invention, a heavy duty yet compact and versatile machining system is provided in which an operator can precisely control and run a milling machine from a safe position above a radioactive environment. The ability of the machining device 14 to be accurately and easily connected to the platform 12 from above permits use of the machine in those areas of a nuclear reactor vessel in which access is afforded only from above. This vertical access is sufficient such that once the platform is positioned by a manipulator or by a diver, the machining device 14 is lowered thereon and guided into the proper position. Thus the machining operation can take place by way of the remote controlling of the drive motor 42 as well as the X Y Z adjustments.

What is claimed is:

1. An underwater machining system for the repair and maintenance of nuclear vessels comprising:

- a platform with means for supporting said platform in a substantially horizontal plane;
- a machining device including a drive motor and a cutter means operatively connected to said drive motor for performing a machining operation, a spacial positioning means for positioning said machining device into a position relative to said platform; and means for detachably connecting said machining device to said platform;
- a guide means for guiding said machining device on said platform so that when said machining device is lowered from a detached position above said platform to an attached position on said platform and for automatically aligning the machining device relative to the platform.

2. An underwater machining system for the repair and maintenance of nuclear vessels comprising:

- a platform with means for supporting said platform in a substantially horizontal plane;
- a machining device detachably connectable to said platform comprising a milling or boring machine and a spacial positioning means for locating said milling or boring machine in a precise working position, said spacial positioning means including adjustment means for movement of said milling or boring machine along its X Y and Z axes;

a guide means for automatically aligning said machining device on said platform, so that when said detachable machining device is lowered from a detached position above the platform to an attached position on the platform, said guide means automatically aligns the machining device to the platform; and a remote control means for operating the spacial positioning means and said milling or boring machine.

3. The machining system of claim 2, wherein said guide means includes at least one rough guide element provided on said platform and extending upward therefrom for engaging and aligning a lower portion of said machining device.

4. The machining system of claim 3 wherein said rough guide element includes a tapered cam surface thereon.

5. The machining system of claim 4 including a plurality of rough guide elements arranged on said platform to engage the lower portion of said machining device at various points around its periphery.

6. The machining system of claim 3 further including at least one fine guide element depending downward from said lower portion of said machining device to be inserted into a fine guide opening provided at an upper surface of said platform.

7. The machining system of claim 2, wherein said guide means includes a rough guide means and a fine guide means for sequentially aligning said machining device to said platform when lowered into position.

8. The machining system of claim 2 further including a lock means for detachably securing said machining device to said platform when activated.

9. The machining system of claim 8 wherein said lock means is hydraulically activated and includes a plurality of swinging locks pivotally mounted to said platform to move from a non-interfering position to an interfering position engaged with a ledge provided on a lower portion of said machining device.

10. The machining system of claim 2 wherein said adjustment means includes:

a first slide mechanism and drive means for moving said milling or boring machine in a first horizontal direction, a second slide mechanism and drive means for moving said milling or boring machine in a second horizontal direction perpendicular to said first direction, and a third slide mechanism and drive means for moving said milling or boring machine in a vertical direction, wherein said first, second, and third drive means are each independently driven from said remote control means by first, second and third remote drive shafts which extend above the vessel.

11. The machining system of claim 2 wherein the means for supporting said platform includes a first pair of legs extending upward and away from said platform to support said platform from a side wall of a reactor vessel.

12. The machining system of claim 11 wherein each leg of said first pair of legs includes a foot secured at the distal end of each leg with a wedge means slidably supported by each foot for clamping to an annular space within a reactor vessel.

13. The machining system of claim 11 including a support bar connected between said first pair of legs with a pair of register buttons thereon for locating a known positional element that is secured to the reactor vessel against which said legs are supported.

14. An underwater machining system for the repair and maintenance of nuclear vessels comprising:

a platform with means for supporting said platform in a substantially horizontal plane;

a machining device detachably connectable to said platform comprising a milling or boring machine and a spacial positioning means for locating said milling or boring machine in a precise working position, said spacial positioning means including adjustment means for movement of said milling or boring machine along its X Y and Z axes;

a guide means for automatically aligning said machining device on said platform, so that when said detachable machining device is lowered from a detached position above the platform to an attached position on the platform, said guide means automatically aligns the machining device to the platform, said guide means including a rough guide means including at least one rough guide element with a cam surface extending upwardly from said platform to engage a lower portion of said machining device and a fine guide means including at least one fine guide element extending downwardly from said lower portion to engage with an opening in said platform; and a remote control means for operating the spacial positioning means and said milling or boring machine.

15. The machining system of claim 14 including a plurality of rough guide elements arranged on said platform to engage the lower portion of said machining device at various points around its periphery.

16. The machining system of claim 14 further including a lock means for detachably securing said machining device to said platform when activated.

17. The machining system of claim 16 wherein said lock means is hydraulically activated and includes a plurality of swinging locks pivotally mounted to said platform to move from a non-interfering position to an interfering position engaged with a ledge provided on a lower portion of said machining device.

18. The machining system of claim 14 wherein said adjustment means includes:

a first slide mechanism and drive means for moving said milling or boring machine in a first horizontal direction, a second slide mechanism and drive means for moving said milling or boring machine in a second horizontal direction perpendicular to said first direction, and a third slide mechanism and drive means for moving said milling or boring machine in a vertical direction, wherein said first, second, and third drive means are each independently driven from said remote control means by first, second and third remote drive shafts which extend above the vessel.

* * * * *